Dec. 30, 1947.　　　　T. A. COHEN　　　　2,433,599
CONTROL APPARATUS
Filed Dec. 31, 1942　　　　2 Sheets-Sheet 1

Theodore A. Cohen, INVENTOR,

BY Theodore W. Miller,
Attorney

Dec. 30, 1947.   T. A. COHEN   2,433,599
CONTROL APPARATUS
Filed Dec. 31, 1942   2 Sheets-Sheet 2

Theodore A. Cohen, INVENTOR,
BY Theodore W. Miller,
Atty.

Patented Dec. 30, 1947

2,433,599

UNITED STATES PATENT OFFICE 2,433,599

CONTROL APPARATUS

Theodore A. Cohen, Chicago, Ill., assignor, by mesne assignments, to Wheelco Instruments Company, Chicago, Ill., a corporation of Illinois Application December 31, 1942, Serial No. 470,917

5 Claims. (Cl. 137—68)

This invention relates to electrical control apparatus.

One of the objects of my invention is to provide an improved apparatus for enabling a liquid level responsive capacity change device to control a vacuum tube oscillator circuit in accordance with capacity changes, which apparatus does not require the major portion of the oscillator circuit to be situated in the immediate vicinity of the liquid level responsive device.

Other and further objects of my invention will be apparent hereinafter as the same becomes better understood from an examination of the specification and claims and in conjunction with the accompanying drawings, wherein;

Figure 1:
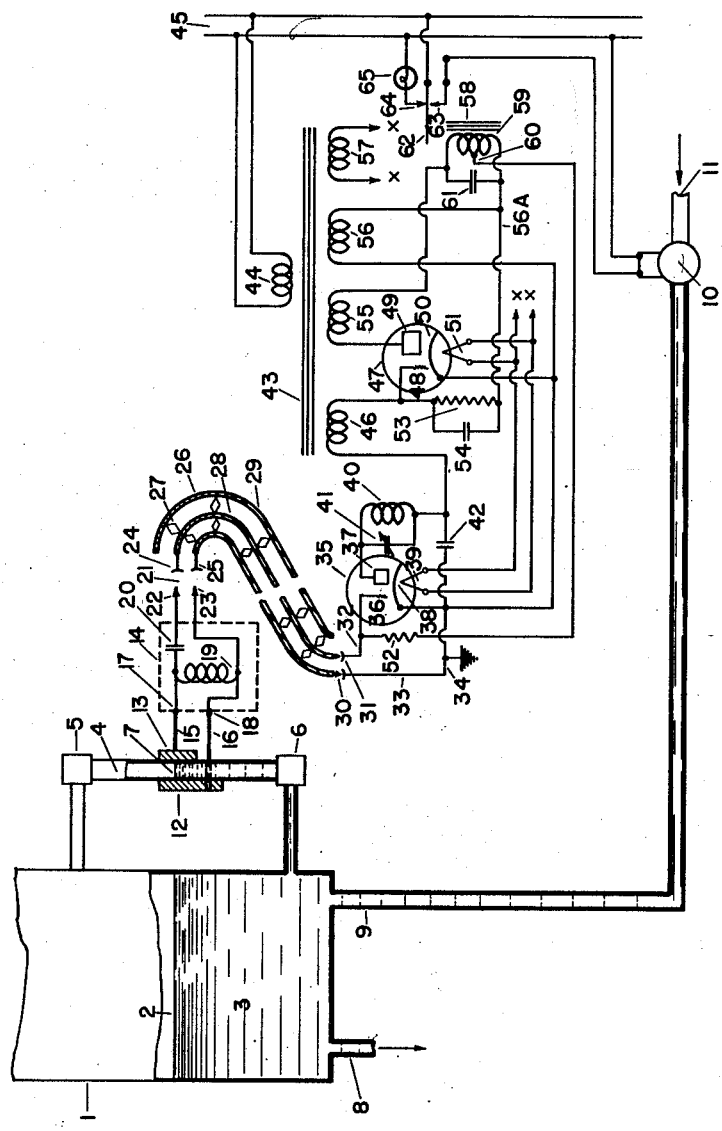
Fig. 1 is a schematic and a diagrammatic view of an electrical control apparatus involving this invention.

Referring to the drawings more particularly, reference character 1 designates a container containing a liquid 3 at a level 2. The container 1 is provided with a gauge glass 4 vertically mounted in upper and lower fittings 5 and 6, respectively, which communicate by ducts to the container 1 above and below the level of the liquid therein. The liquid level 7 in gauge glass 4 is substantially the same as and corresponds to the level 2 in the container 1. The container 1 is shown with an outlet 8 and an inlet feed pipe 9 connected to an electric feed valve 10, the latter being supplied from a fuel, or other fluid, source 11.

Figure 3:
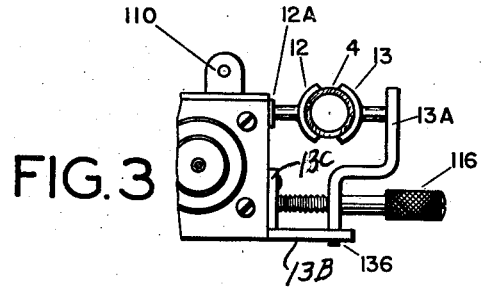
Fig. 3 is an enlarged fragmentary view, taken at the line 3—3 on Figure 2, with parts in elevation.
Figure 2:
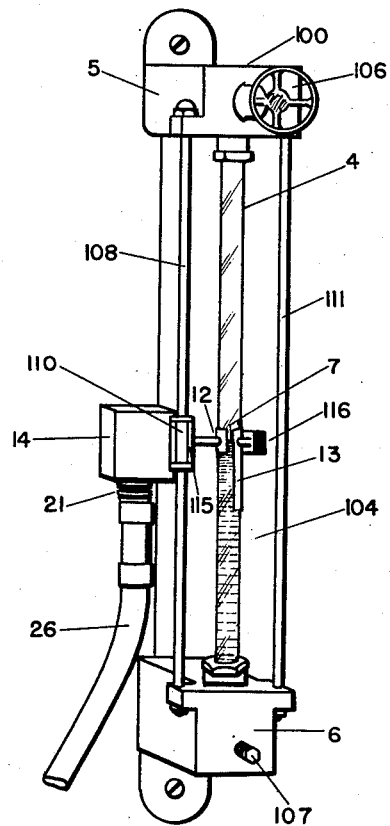
Fig. 2 is an enlarged perspective detail view of the gauge glass and fittings of Figure 1 together with the grid tank circuit container and associated parts.
Figure 4:
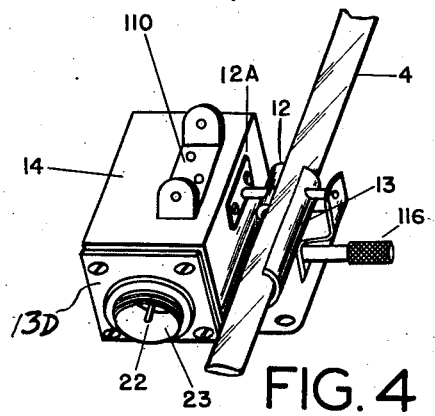
Fig. 4 is a fragmentary detail perspective view of the parts shown in Figure 3.
Figure 5:
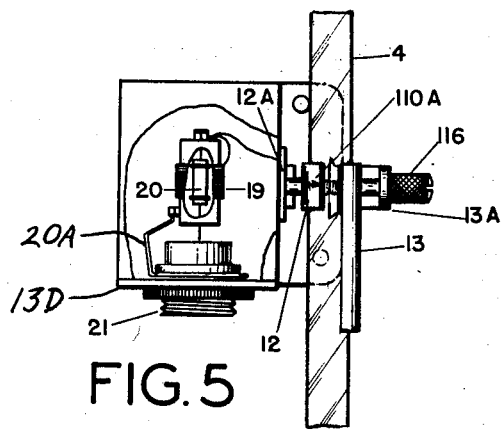
Fig. 5 is an elevational fragmentary view of the parts shown in Figures 3 and 4.

On opposite sides of gauge glass 4 are mounted semi-cylindrical metal plates 12 and 13, insulated from each other. These plates 12 and 13 are preferably mounted so as to extend above and below the pre-chosen liquid level at which it is desired to maintain the liquid and they constitute a liquid level responsive capacity change device in the nature of a variable condenser whose capacity varies in accordance with changes in the liquid level, the liquid acting as a dielectric to vary the capacity as the liquid rises or falls. This capacity change device is adapted to control an oscillator circuit remotely situated as will be hereinafter described. A grid tank circuit is mounted in a container 14, the latter being preferably of Bakelite and mechanically connected to the plates 12 and 13 which plates not only act as condenser plates but also as clamps to hold said container in desired position on the gauge glass 4. The details of this mounting will be hereinafter described in conjunction with Figures 2 to 5 inclusive.

A conductor 15 connects plate 13 with terminal 17 on container 14 and a conductor 16 connects plate 12 to a terminal 18 on said container. The terminal 17 is connected to one end of a coil 19 and also to a coupling condenser 20 and the latter is connected to a male terminal 22 of a dual conductor concentric separable connector 21 having male plugs 22 and 23. The terminal 18 is connected to the other end of coil 19 and also to the plug 23.

The male plugs 22 and 23 are adapted to connect with female connector elements 24 and 25, respectively, at one end of a concentric conductor cable 26 insulated from ground by an external rubber sheath or cover (not shown). The cable 26 comprises an inner conductor 28, separators 27 and an outer conducting sheath 29. The end of the cable opposite to the connector 21 is provided with a connector 30 similar thereto for connection to the input of an oscillator circuit hereinafter described.

The concentric co-axial conductor cable is constructed in well known manner with a core conductor fixedly and concentrically positioned within a conducting sheath which may be covered with insulation (not shown). By properly chosing the values of the capacitive and inductive components of the oscillating circuit in enclosure 14, the cable is properly terminated so that minimum R F loss is obtained in the system due to the cable for any substantial length thereof. In this manner the remote control assembly just described may control an oscillator apparatus hereinafter described without fear of transmission losses which otherwise would reduce the sensitivity of the apparatus if not actually prevent its operation.

The oscillator circuit includes a vacuum tube 35 connected to a plate tank comprising an inductance 40, variable condenser 41 for tuning to resonance, as will hereinafter be described, and grid bias resistor or grid leak 52 for said tube.

Alternating current voltages are obtained from a multi-winding transformer having a primary winding 44, connected to a suitable source of alternating current 45, and having a plurality of secondary windings 46, 55, 56 and 57 arranged to supply suitable voltages to the tube circuits. The tube 35 and repeater tube 47, hereinafter described, are self rectifying and therefore the operation will be described only with respect to the positive half cycles of the alternating current voltages.

The output circuit of the tube 35 may be traced from the left-hand terminal of the secondary winding 46 through the plate tank circuit 40, 41, the anode or plate 37, the cathode 38, the secondary winding 56, conductor 56a, a load impedance or resistor 53 and thence to the right hand terminal of secondary winding 46. By-pass condensers 42 and 54 are connected as shown and prevent the flow of high frequency oscillatory currents through the transformer windings and through the load impedance 53. As will be apparent the total voltage impressed across the anode circuit of tube 35 is the sum of the voltages of the secondary windings 46 and 56.

The output circuit for the repeater or amplifier tube 47 may be traced from the left hand terminal of the secondary winding 55 to the anode or plate 49, the cathode 50, the secondary winding 56, the voltage of which is in phase with the voltage of the winding 55, the operating winding 59 of the relay 58 and to the right hand terminal of the winding 55. A condenser 61 is connected as shown across the relay winding 59 and prevents chatter of relay by supplying energy to relay during negative or non-conducting portion of A. C. cycle. Transformer secondary winding 57 is connected to filaments 39 and 51 to heat cathodes 38 and 50, respectively, by wires X—X not completed. The grid bias for effecting proper operation of the repeater tube 47 is obtained by connecting the grid or control electrode 48 to one end of the load resistor 53, the remaining portion of this circuit extending from the cathode 50 to the secondary transformer winding 56, the conductor 56a to the opposite end of the load resistor 53. It will be apparent that the voltage across the winding 56 is opposite to and thus compensates for a portion of the voltage drop across the load impedance 53 and accordingly when the oscillator tube 35 is in oscillatory condition so that a plate current of low value flows through the load impedance 53, a minimum negative bias equal to the difference between the voltage of the winding 56 and the voltage drop across the load impedance is impressed on the grid 48. Under these conditions, and with voltages, the tube constants, and the value of the load resistance so pre-chosen to provide a low negative grid bias, a high repeater plate current is obtained for proper operation of the relay.

A regenerative coupling is provided between the grid circuit of the tube 35 and the output of the repeater tube 47, as shown. The grid circuit for the oscillator tube 35 extends from the cathode 3, the transformer winding 56, the relay winding 59, the tap 60 and the grid bias resistor or grid leak 52 to the grid 36.

A fixed grid bias is applied, by the above circuit, to the grid 36 which is equal to the voltage drop across the relay winding 59 to tap 60 and is so chosen that with maximum current flowing in the output circuit of the amplifier or repeater tube 47 the maximum desired negative bias is applied to the grid 36.

As will be hereinafter explained the plate tank is tuned to predetermined resonance with condenser 41 to open relay 58, with liquid level at prechosen control level. When level drops, capacity between plates 12 and 13 decreases, causing eventual closing of relay 58; which opens valve 10 to feed more liquid to tank.

When liquid level rises, increasing capacity between plates, the oscillator circuit is detuned, causing its plate current to rise sharply, increasing the voltage drop across the resistor 53 which correspondingly increases the negative bias upon the amplifier tube 47 with a consequent drop in its plate current through the relay 59. The decrease in current through the relay 59 causes a decrease in the negative grid bias applied to the grid of the oscillator tube 35, which tends to further increase the plate current of the oscillator tube 35. This increase in the oscillator plate current further increases the voltage drop across the load resistor 53 and the negative bias upon the amplifier tube 47 with the consequent effect of rapidly dropping the amplifier plate current to the cut-off point, which causes approximately zero level in plate current and opening of relay 58 to close valve 10 and cut off feed to tank 1. When level recedes the reverse occurs. The oscillator plate current drops, decreasing the drop across resistor 53, which decreases the negative bias on the amplifier tube 47; the plate current of the amplifier tends to increase, increasing the drop across the relay 53, which increases the negative bias on the grid of the oscillator 35, aiding in dropping the oscillator plate current, which further tends to decrease the bias upon the amplifier 47, etc., with the result that the final positioning of the plate current of amplifier 47 is at saturation. By the judicious choosing of load resistance 53, of the resistance of the relay winding 59 and the proper apportioning of bias voltages as shown, the limits of plate current between cut-off and saturation may be fixed at any desired value. The result is that control of this plate current change is always maintained with the obtaining of abrupt plate current changes of a very rapid nature. The result obtainable is comparable to the triggering off of a "Thyratron" type hot cathode grid control rectifier without the necessity of using gas-filled tubes.

Study of the circuit arrangement will also bring out that the system is self compensating for changes in line voltage, which prevents shiftage of the control point if the line voltage should change.

In operation the grid and plate tanks are tuned to predetermined resonant point by adjustment of 41 to open relay 58 with the liquid level at prechosen control level. If the liquid level drops below the prechosen control level, the capacity between plates 12 and 13 decreases causing the circuit to reapproach the resonance point under which conditions steady plate current in first stage is reduced. The drop across 53 is lowered and corresponding negative bias on grid 48 is lowered with resulting increased plate current in plate circuit of second stage and relay 59 energizing relay 58 and closing contacts 62 and 63 thereby opening electric valve 10.

As liquid level rises capacity between plates 12 and 13 increases, detuning oscillator with consequent rise in plate current of first tube, increasing voltage drop across 53 and corresponding negative bias on grid 48, of second stage, whereupon plate current of second stage drops thru relay winding 59 causing relay to be deenergized opening contacts 62 and 63 and closing valve 10.

This control process is repeated, maintaining liquid at proper level.

It will be noted that the plate supply for tubes 35 and 47 are obtained from winding 46 and 55, respectively, in series with 56. Should the line voltage fall the supply voltage from 55 would reduce and therefore the plate current flow in plate circuit of tube 47 would tend to decrease. However, since winding 46 supplies the plate circuit of tube 35, and since the negative bias on grid 48 is obtained from drop across resistor 53 due to plate current flow in plate circuit of tube 35, the plate current of tube 35 is also reduced with reduction of voltage from 46. Therefore negative bias on grid 48 is reduced keeping the plate current flow in plate circuit of tube 47 constant. The reverse result is obtained with rise in line voltage. This self-compensating feature is important in electronic control apparatus since it prevents shift of the control upon changes in line voltage. Aging of tubes is also compensated for in the same manner in conjunction with the regenerative connection between tap 60 and resistor 52.

It is not necessary that the apparatus be limited to the use of separate vacuum tubes, each containing separate triode elements, since these separate tubes have been chosen only as a matter of convenience. Dual purpose tubes having double triode elements in a common envelope may be operated in the same manner. Direct current voltages may also be used.

In summary, the advantages of this circuit are manifest, inasmuch as a relay with a high throwout percentage is not necessary, since the plate current changes through said relay are very rapid and very large. It is impossible to lose control of the oscillator, since, because of the fact that it is self-rectified, oscillations, no matter how minute, will always reoccur. Other variations of this circuit will readily occur to those versed in the art, such as the use of a common power supply, with a self-rectified circuit, instead of separate voltages as shown. Such circuits have been designed and are entirely feasible, the one shown being one of a family of such circuits and being chosen as the most descriptive of the above-explained operation.

Referring to Figures 2 to 5, inclusive, the gauge glass and associated parts heretofore described are shown more in detail as comprising a manometer generally designated as 100 and including upper and lower fittings 5 and 6 between which is mounted the gauge glass 4. When by-pass valve 106 is open the liquid from container 1 may form a column 104 in glass 4. A drain plug 107 is provided in the lower fitting 6 for cleaning. Vertical slide guide bar 108 is mounted between the fittings 5 and 6, the bar 108 acting to slidably guide the grid tank housing or container 14 heretofore referred to, the latter being provided with a bracket 110 slidably attached to said container whereby to clamp the container in desired vertical position. The grid tank coil 19 and condenser 20 are shown mounted with the latter supported centrally and longitudinally of the cylinder forming the core for said coil, said cylinder being attached to a suitable clip 20A. The clip 20A is apertured at its lower or basic end and held between a flange or terminal 21 and the bottom of housing 14. The clip 20A not only acts to support the grid tank unit (coil 19 and condenser 20) within the housing 14 but also electrically connects one end of said coil to the plug 23 which connects with the conducting sheath of conductor 29. The centrally mounted condenser 20 leads to the male plug 22 which connects with female plug 24 connected to the central coaxial conductor 28.

One semi-cylindrical metal plate 12 is rigidly connected by means of a flange and screws to the side of container or housing 14, the latter being of non-conducting material (preferably Bakelite). The other semi-cylindrical and opposing plate 13 has an integral stem which fits in an opening in movable bracket 13A. The bracket 13A has a reduced end portion at one end extending in an opening in a plate 13B whereby a manually operable screw 116 may be operated to pivot said bracket about said end to clamp the plates 12 and 13 together to hold the housing 14 in desired vertical position on the gauge glass 4. The plates 12 and 13 thus have a mechanical clamping and supporting function as well as the electrical function of a variable condenser whose capacity is varied by the change in level 7.

A portion 13C is struck from plate 13B to threadedly receive the inner end of screw 116. A flange 13D is bent from the plate 13B to which is screwed the housing 14.

The particular liquid level that may be desired to be maintained by the afore-described apparatus may be selected or prechosen by adjusting the vertical position of the container 14 to bring the pointer 110a into cooperation with the position corresponding to level desired a scale (not shown) which may be alongside the gauge glass or calibrated directly thereon.

It is apparent that operation may be had with the control system reversed wherein at prechosen level the system is detuned and retuned when level falls.

The advantages of the aforedescribed apparatus wherein the oscillator circuit per se may be situated remotely from the manometer 100 and grid tank container 14 will be apparent without further detail.

Pilot light 65 indicates normal level is being maintained.

I am aware that many changes may be made and details varied without departing from the principles of my invention and I therefore do not wish to be limited to the details shown and described.

I claim:

1. In a control system, the combination of a vacuum tube oscillator having input and output circuits, a load impedance effectively included in said output circuit, a vacuum tube repeater having an input circuit conductively coupled to said load impedance to control the output circuit of said repeater in accordance with changes in the voltage across said load impedance, an electro-responsive device having an operating winding effectively included in said repeater output circuit, and a liquid level responsive device for affecting the tuning of said oscillator circuit to vary the voltage across said load impedance whereupon said repeater causes operation of said electro-responsive device for controlling a liquid level.

2. In a control system, the combination of a vacuum tube oscillator having turned input and output circuits, a load impedance effectively included in said output circuit adapted to be traversed only by the nonpulsating component of the current in said output circuit, a vacuum tube repeater having an input circuit conductively coupled to said load impedance for energization in accordance with the voltage across said impedance, a repeater output circuit, a relay having an operating winding connected to said repeater output circuit, and means responsive to a condition to be controlled by operation of said relay including a portion of said oscillator input circuit spaced from the rest of said oscillator circuit, and connected thereto by a coaxial conductor cable of fixed capacitance, for changing the tuning of said oscillator to thereby vary the voltage across said load impedance to effect operation of said relay.

3. In a control system, the combination of an oscillator circuit including input and output circuits coupled with the input and output electrodes of an electron discharge device, an impedance change device including an oscillating tank circuit in said input circuit responsive to a condition to be controlled and connected to said oscillator circuit through a fixed impedance conductor to change the tuning thereof, an amplifier circuit including input and output circuits coupled with the input and output electrodes of an electron discharge device, means coupling said amplifier input circuit and said oscillator output circuit whereby a change in the tuning of said oscillator circuit effects a change in the output current of said amplifier, an electro-responsive device having an operating winding adapted to operate from said current between two positions upon changes of predetermined magnitude in said amplifier output current, and a regenerative coupling between said winding in said amplifier output circuit and said oscillator input circuit for effecting a sharp variation of said amplifier output current between cut-off and saturation in response to an initial change in said amplifier output current, whereby said electro-responsive device is quickly operated between said two positions in response to a critical change of the impedance device regardless of the magnitude of said change.

4. In a liquid level control system, the combination of an electron discharge device or tube having input and output circuits adapted to be tuned to resonance to cause said tube to operate as an oscillator, a load impedance effectively included in said output circuit so as to be traversed only by the non-pulsating component of the oscillator output current, whereby the voltage across said impedance changes when the oscillatory condition of said tube varied from resonance, a repeater tube having input and output circuits, a source of biasing potential, means connecting said load impedance and said source in series relation to said repeater input circuit with the voltage of said source in opposition to and of less magnitude than the voltage when said oscillator is in resonant condition, an electro-responsive device having an operating winding effectively included in said repeater output circuit for controlling a source of liquid in response to variations in the energization of said winding and liquid level responsive means connected to the oscillator circuit by a fixed impedance conductor to control the tuning of said oscillator circuit in accordance with changes in liquid level, whereby the bias voltage impressed on said repeater input circuit varies from a desired minimum during resonant conditions to a desired maximum upon changes in liquid level to cause a cessation of oscillations, said variation in the bias voltage controlling the output of said repeater tube to operate said electroresponsive device in accordance with a change in liquid level.

5. The combination of a liquid level responsive impedance change device, an oscillator circuit provided with a plurality of tank circuits and spaced, except for one of said tank circuits, a substantial distance from said device, one of said tank circuits being mounted in proximity to said device, and operatively connected thereto for control thereby, said one tank circuit and device being in the form of a self contained unit, a vertically adjustable support for said unit whereby any desired liquid level with reference to which said device will operate may be selected, and a fixed impedance conductor for connecting said one tank circuit and the rest of the oscillator circuit whereby the same may be controlled in accordance with changes in liquid level with reference to the prechosen level.

THEODORE A. COHEN.

REFERENCES CITED

The following references are of record in the file of this patent:

UNITED STATES PATENTS

| Number | Name | Date |
|---|---|---|
| 2,120,048 | Turner | June 7, 1938 |
| 2,316,875 | Laboulais | Apr. 20, 1943 |
| 2,227,487 | Chaffee | Jan. 7, 1941 |
| 2,169,305 | Tunick | Aug. 15, 1939 |
| 2,013,140 | Friis | Sept. 3, 1935 |
| 1,941,472 | Heegner | Jan. 2, 1934 |
| 2,150,431 | Drenkard, Jr. | Mar. 14, 1939 |
| 2,261,815 | Thompson | Nov. 4, 1941 |
| 2,310,298 | Kuhl | Feb. 9, 1943 |
| 2,368,052 | Unger | Jan. 23, 1945 |
| 2,288,838 | Pike et al. | July 7, 1942 |
| 2,354,964 | Ostermann et al. | Aug. 1, 1944 |
| 2,076,944 | Howe | Apr. 13, 1937 |
| 2,355,088 | Lavoie | Aug. 8, 1944 |
| 2,276,122 | Tull | Mar. 10, 1942 |

FOREIGN PATENTS

| Number | Country | Date |
|---|---|---|
| 499,219 | Great Britain | Jan. 20, 1939 |